(12) United States Patent  (10) Patent No.: US 9,279,953 B2
Hou  (45) Date of Patent: Mar. 8, 2016

(54) OPTICAL DEVICE AND METHOD FOR PRODUCING THE SAME

(71) Applicant: Genius Electronic Optical Co., Ltd., Taichung (TW)

(72) Inventor: Hsien-Chang Hou, Taichung (TW)

(73) Assignee: GENIUS ELECTRONIC OPTICAL CO., LTD. (TW)

( * ) Notice: Subject to any disclaimer, the term of this patent is extended or adjusted under 35 U.S.C. 154(b) by 36 days.

(21) Appl. No.: 14/261,752

(22) Filed: Apr. 25, 2014

(65) Prior Publication Data

US 2015/0103421 A1  Apr. 16, 2015

(30) Foreign Application Priority Data

Oct. 14, 2013 (CN) .......................... 2013 1 0479311

(51) Int. Cl.
*G02B 7/02* (2006.01)
*B29D 11/00* (2006.01)
*B29C 45/16* (2006.01)
*B29L 11/00* (2006.01)

(52) U.S. Cl.
CPC .............. *G02B 7/02* (2013.01); *B29C 45/1615* (2013.01); *B29D 11/0073* (2013.01); *B29D 11/00403* (2013.01); *B29L 2011/0016* (2013.01)

(58) Field of Classification Search
CPC ......... B29C 45/1615; G02B 7/00; G02B 7/02
USPC ......... 359/800, 802, 804, 805, 808, 811, 817, 359/199, 819
See application file for complete search history.

(56) References Cited

U.S. PATENT DOCUMENTS

2012/0212843 A1\* 8/2012 Lai et al. ....................... 359/811

\* cited by examiner

*Primary Examiner* — Tuyen Tra
(74) *Attorney, Agent, or Firm* — Baker & McKenzie LLP (57) ABSTRACT

An optical device includes a supporting frame and a light-transmissive element. The supporting frame has a frame body defining a through hole, and an extending portion extending from a side of the frame body and having a first cutting edge. The light-transmissible element is disposed on the supporting frame and has a main body aligned with the through hole, and an extending portion extending from a side of the main body and aligned with the extending portion of the supporting frame. The extending portion of the light-transmissible element has a second cutting edge that is flush with the first cutting edge of the supporting frame.

11 Claims, 7 Drawing Sheets

OPTICAL DEVICE AND METHOD FOR PRODUCING THE SAME

CROSS-REFERENCE TO RELATED APPLICATION

This application claims priority of Chinese Patent Application No. 201310479311.6, filed on Oct. 14, 2013.

BACKGROUND OF THE INVENTION

1. Field of the Invention

The invention relates to an optical device and a method for producing the same, more particularly to an optical device made by injection molding and a method for producing the same.

2. Description of the Related Art

Conventionally, while utilizing a bi-injection molding process to form two coupling components, which are made from various materials, a first component is formed using a first mold set, followed by cutting off unwanted portions (such as segments formed in sprue channels). Then, the first component is placed into a second mold set to form a second component coupled to the first component, followed by cutting off sprue segments of the second component to obtain the final product. However, the conventional bi-injection molding process has several disadvantages:

(i) A cutting step is needed for each of the first and second components, thereby increasing the manufacturing time and lowering the manufacturing efficiency of the final product.

(ii) Since the cutting steps for the first and second components are consecutively performed, the first and second components may be formed with cutting edges that are located at various sites of the final product (e.g., left and right sides or top and bottom sides), and may increase the level of tolerance of the final product.

(iii) The first component needs to be precisely placed into the second mold set, such that the extra manufacturing time for aligning the first component lowers the manufacturing efficiency as well.

SUMMARY OF THE INVENTION

Therefore, the object of the present invention is to provide an optical device and a method for producing the same that may alleviate the aforementioned drawbacks of the prior art.

According to one aspect of the present invention, an optical device includes a supporting frame and a light-transmissible element.

The supporting frame has a frame body defining a through hole, and an extending portion extending from a side of the frame body and having a first cutting edge.

The light-transmissible element is disposed on the supporting frame and has a main body aligned with the through hole, and an extending portion extending from a side of the main body and aligned with the extending portion of the supporting frame. The extending portion of the light-transmissible element has a cutting edge that is flush with the cutting edge of the supporting frame.

According to another aspect of the present invention, a method for producing an optical device comprises the following steps of:

(a) providing a first mold set defining a first sprue channel and a supporting frame-forming space that is in spatial communication with the first sprue channel;

(b) filling a raw material of a supporting frame into the supporting frame-forming space and the first sprue channel, so as to form a supporting frame and a first sprue segment that is connected to the supporting frame;

(c) providing a second mold set, followed by placing the supporting frame together with the first sprue segment into the second mold set, such that the second mold set, the supporting frame and the first sprue segment cooperatively define a second sprue channel and a light-transmissible element-forming space that is in spatial communication with the second sprue channel;

(d) filling a raw material of a light-transmissible element into the light-transmissible element-forming space and the second sprue channel, so as to form the light-transmissible element and a second sprue segment that is connected to the light-transmissible element; and (e) disconnecting the first and second sprue segments respectively from the supporting frame and the light-transmissible element, so as to form first and second cutting edges respectively on extending portions of the supporting frame and the light-transmissible element, the first and second cutting edges being flush with each other.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
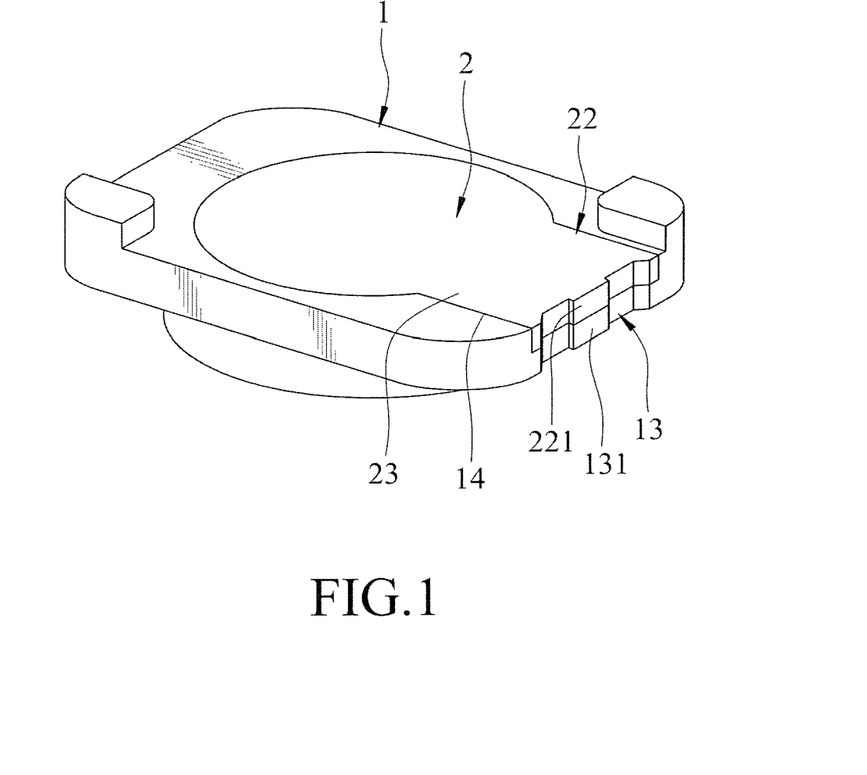
FIG. 1 is a perspective view of a preferred embodiment of an optical device according to the invention.

Referring to FIG. 1, the preferred embodiment of an optical device according to the present invention is shown to include a supporting frame 1 and a light-transmissible element 2.

Figure 4:
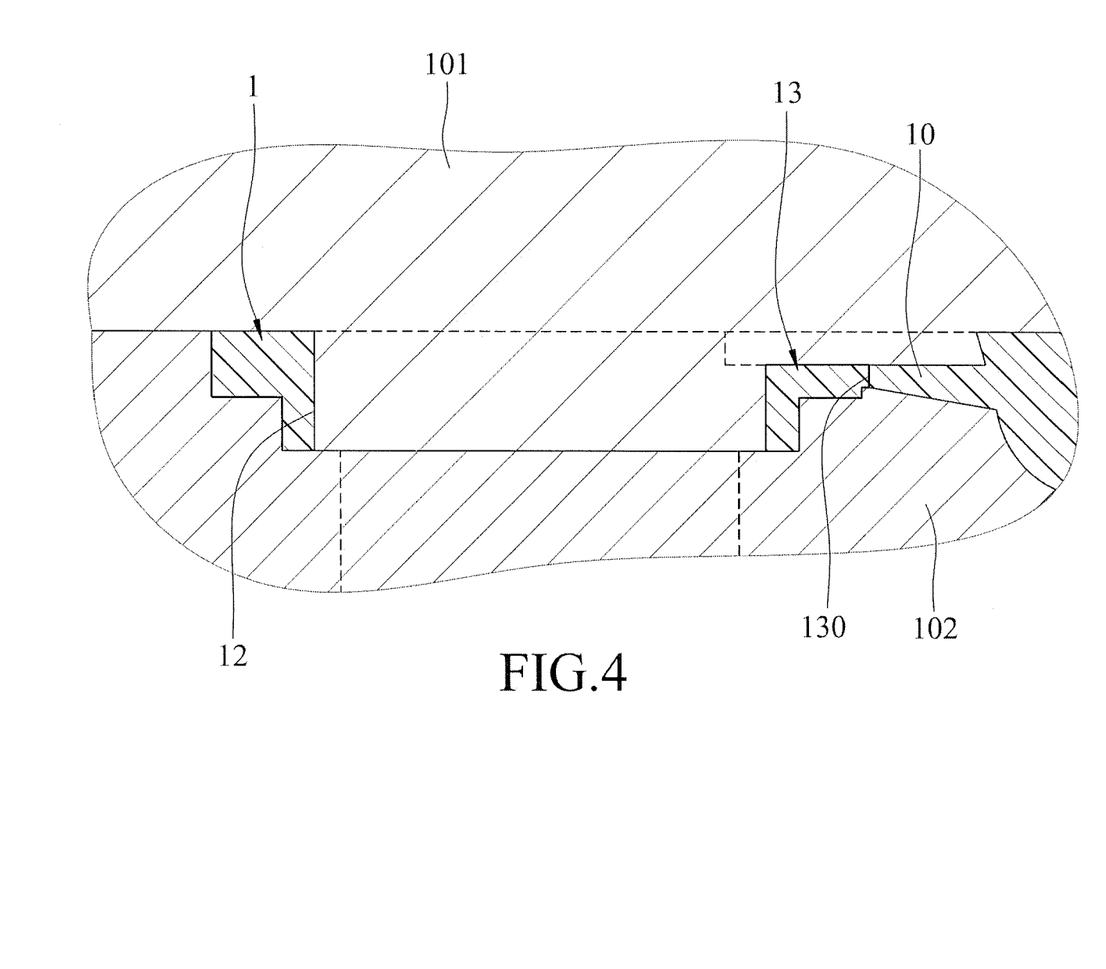
FIG. 4 is an enlarged fragmentary sectional view of the preferred embodiment of the method, illustrating the supporting frame formed in the first mold set.
Figure 5:
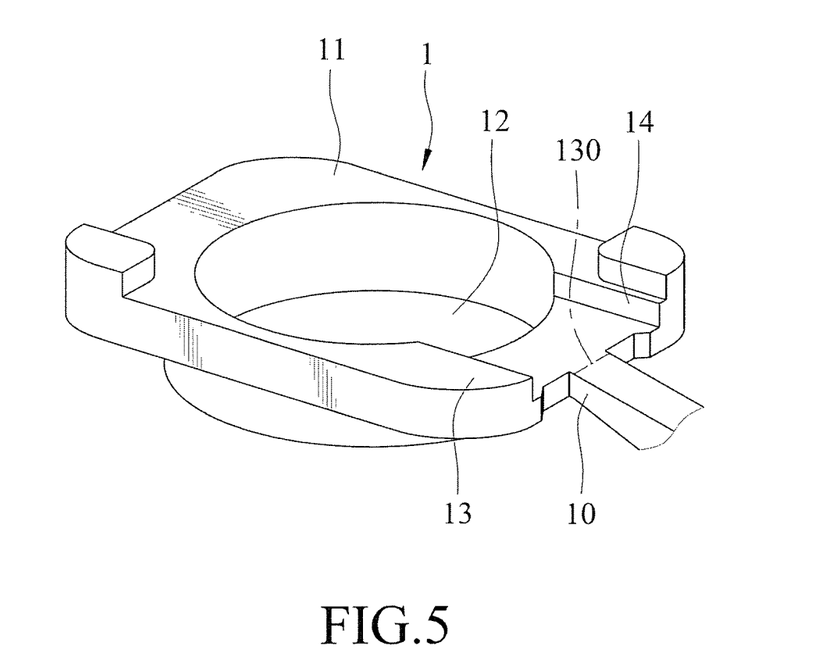
FIG. 5 is fragmentary perspective view showing the supporting frame and a sprue segment connected to the supporting frame.

As shown in FIGS. 1, 4 and 5, the supporting frame 1 is formed by injection molding and has a frame body 11 defining a through hole 12, and an extending portion 13 extending from a side of the frame body 11 and having a first cutting edge 131 that is formed by cutting a first sprue segment 10 from the extending portion 13 of the supporting frame 1. In this embodiment, the extending portion 13 of the supporting frame 1 is formed with an indentation 14.

Figure 7:
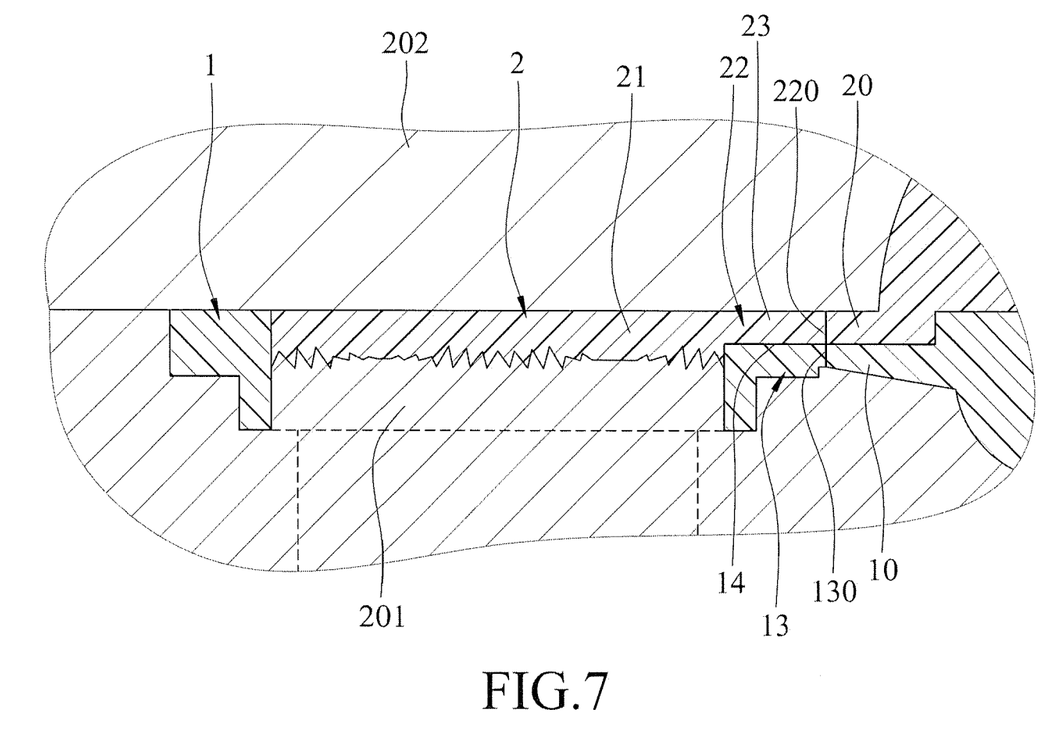
FIG. 7 is an enlarged sectional view illustrating the supporting frame and a light-transmissive element formed in the second mold set.

As shown in FIGS. 1, 5 and 7, the light-transmissible element 2 is disposed on the supporting frame 1 and has a main body 21 aligned with the through hole 12, and an extending portion 22 extending from a side of the main body 21 and aligned with the extending portion 13 of the supporting frame 1. The extending portion 22 of the light-transmissible element 2 has a second cutting edge 220 that is formed by cutting a second sprue segment 20 from the extending portion 22 of the light-transmissible element 2. The light-transmissible element 2 and the supporting frame 1 are integrally formed as one piece by bi-injection molding. In this embodiment, the light-transmissible element 2 has a refractive power, but it may not be required in other embodiments of the present invention. It is worth noting that the first cutting edge 131 of the supporting frame 1 is flush with the second cutting edge 221 of the light-transmissible element 2 due to flush alignment of the first and second sprue segments 10, 20 and simultaneous removal thereof.

In this embodiment, the extending portion 22 of the light-transmissible element 2 is formed with an engaging segment 23 that engages the indentation 14 of the supporting frame 1 for improving coupling strength generated therebetween.

Figure 2:
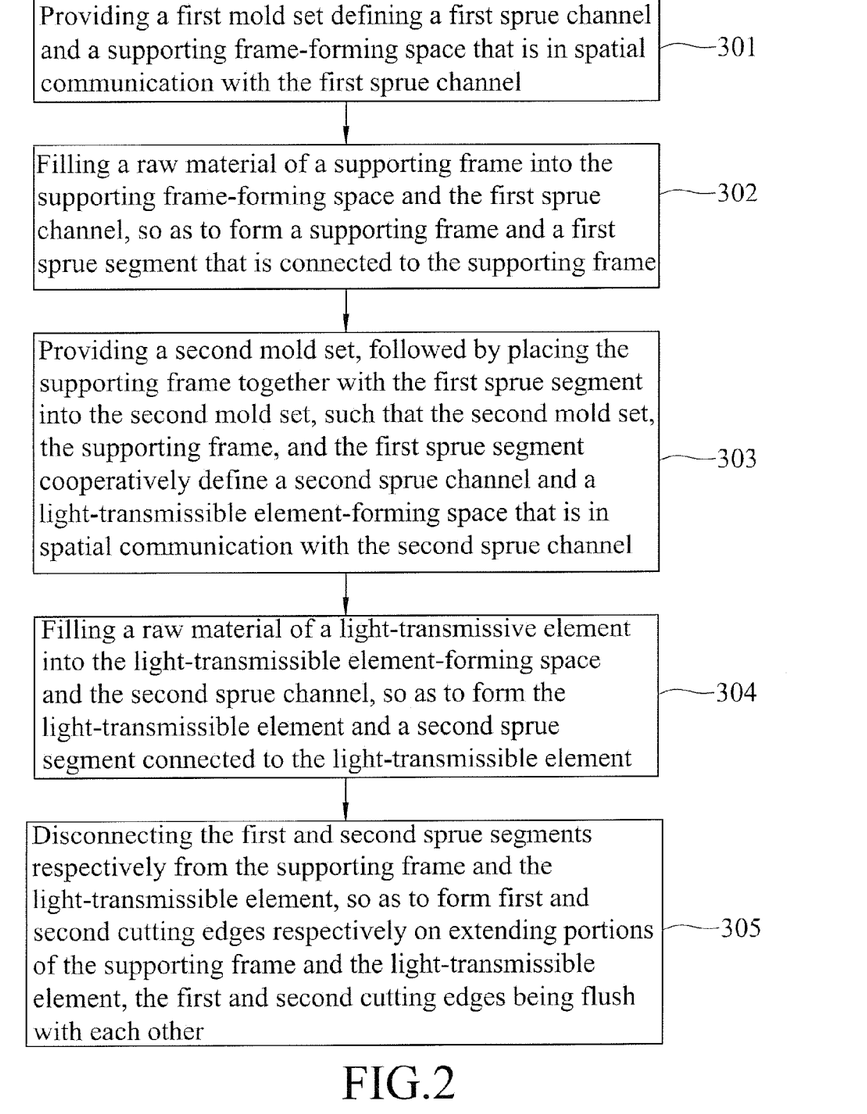
FIG. 2 is a flow chart showing a preferred embodiment of a method for producing the preferred embodiment of the optical device.
Figure 3:
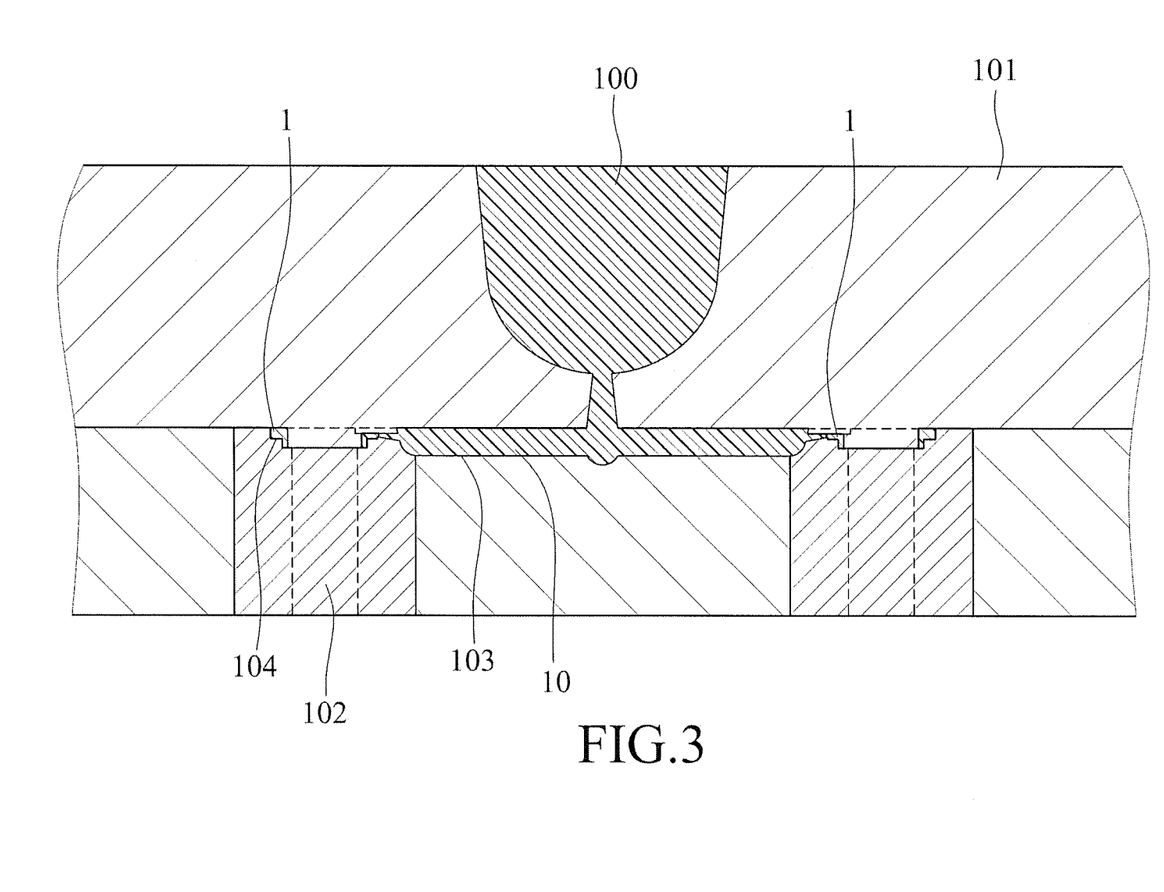
FIG. 3 is a fragmentary sectional view of the preferred embodiment of the method, illustrating that a raw material is filled into a supporting frame-forming space defined by a first mold set.

Referring to FIG. 2, the method for producing the aforementioned Optical device according to the present invention includes the following steps:

Step 301: providing a first mold set including an upper mold 101 and a lower mold 102 (see FIGS. 3 and 4). The upper mold 101 and the lower mold 102 cooperate to define a plurality of supporting frame-forming spaces 104 and a first sprue channel 103 that is in spatial communication with the supporting frame-forming spaces 104.

Step 302: filling a raw material 100 into the supporting frame-forming spaces 104 and the first sprue channel 103 (see FIGS. 3 and 4), so as to form a plurality of the supporting frames 1 and the first sprue segment 10 that is connected to the supporting frames 1 (see FIG. 5).

Figure 6:
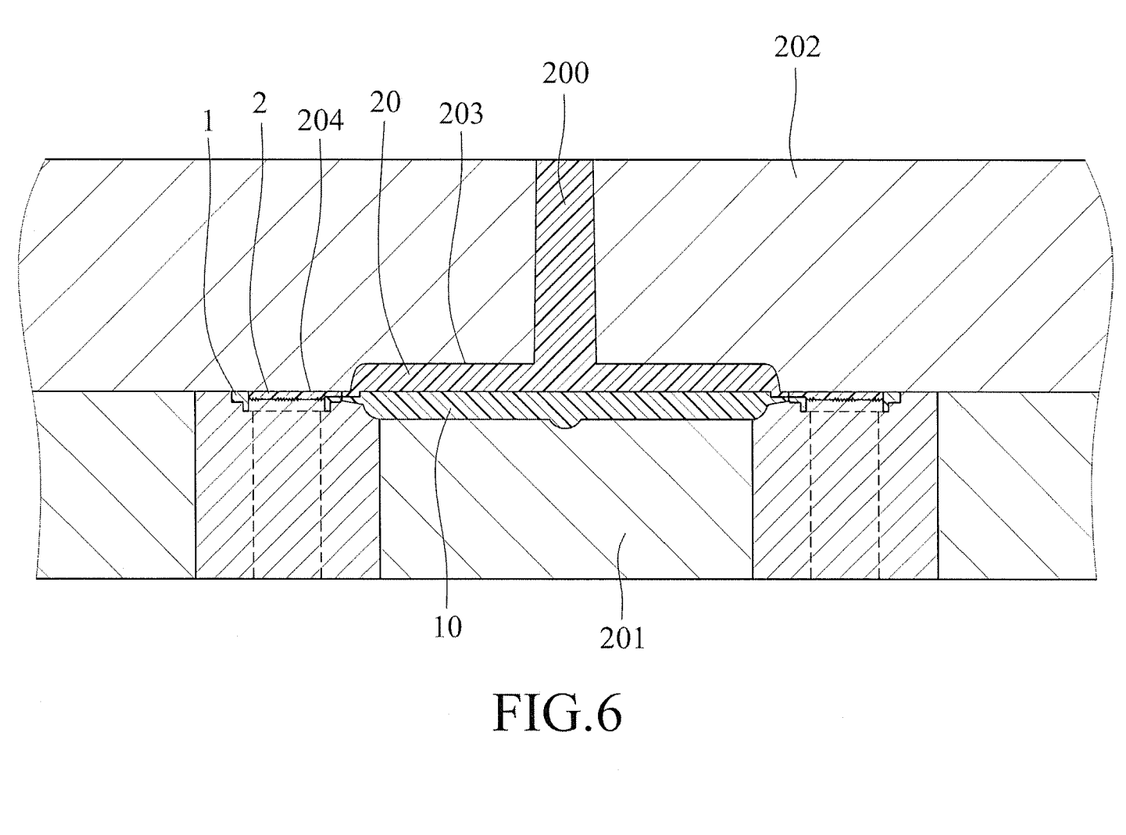
FIG. 6 is a fragmentary sectional view of the preferred embodiment of the method, illustrating a raw material of a light-transmissive element is filled into a light-transmissive element-forming space defined by a second mold set and the supporting frame.

Step 303: providing a second mold set including an upper mold 202 and a lower mold 201, followed by placing the supporting frames 1 together with the first sprue segment 10 on the lower mold 201 (i.e., placing between the upper and lower molds 202, 201), such that the upper and lower molds 202, 201, the supporting frames 1 and the first sprue segment 10 cooperatively define a second sprue channel 203 and a plurality of light-transmissible element-forming spaces 204 that are in spatial communication with the second sprue channel 203 (see FIGS. 6 and 7). It is worth noting that the supporting frames 1 and the first sprue segment 10 are placed directly into the second mold set without performing any cutting (or polishing) process prior to step 303.

Step 304: filling a raw material 200 into the light-transmissible element-forming spaces 204 and the second sprue channel 203 (see FIGS. 6 and 7), so as to form a plurality of the light-transmissible elements 2 and the second sprue segment 20 that is connected to the light-transmissible elements 2.

Step 305: disconnecting/cutting the first and second sprue segments 10, 20 respectively and simultaneously from the supporting frames 1 and the light-transmissible elements 2 along cutting sites 130, 220 respectively between the first sprue segment 10 and the supporting frames 1 and between the second sprue segment 20 and the light-transmissible elements 2, so as to form the first and second cutting edges 131, 221 respectively on the supporting frame 1 and the light-transmissible element 2 of each of the optical devices (see FIG. 1).

There are several advantages of the preferred embodiment according to the present invention:

(i) Since there is no need to perform cutting or polishing process for the supporting frame 1 prior to the formation of the light-transmissible element 2, the manufacturing process of the optical device can be simplified, and manufacturing costs can be thereby reduced.

(ii) The extending portions 13, 22 of the supporting frame 1 and the light-transmissible element 2 are aligned with each other, as well as the first and second sprue segments 10, 20 during step 304, so that, after step 305, the first and second cutting edges 131, 221 can be formed in the flush alignment, and that the tolerance level of the optical device can be thereby reduced.

(iii) Since all of the supporting frames 1 are connected to the first sprue segment 10 at step 302, the supporting frames 1 and the first sprue segment 10 can be moved into the second mold set as one piece, so that a step of aligning each of the supporting frames 1 in the second mold set can be omitted, and the manufacturing efficiency of the optical device can accordingly be improved.

It is also worth noting that the formation of the light-transmissible element 2 can be performed prior to the formation of the supporting frame 1. That is, the order to form the supporting frame 1 and the light-transmissible element 2 by injection molding is not limited thereto according to the present invention.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An optical device comprising:
a supporting frame having a frame body defining a through hole, and an extending portion extending from a side of said frame body and having a first cutting edge; and
a light-transmissible element disposed on said supporting frame and having a main body aligned with said through hole, and an extending portion extending from a side of said main body and aligned with said extending portion of said supporting frame, said extending portion of said light-transmissible element having a second cutting edge that is flush with said first cutting edge of said supporting frame, said extending portion of said supporting frame is formed with an indentation, and said extending portion of said light-transmissible element is formed with an engaging segment engaging said indentation of said supporting frame.

2. The optical device according to claim 1, wherein said light-transmissible element and said supporting frame are integrally formed as one piece.

3. The optical device according to claim 1, wherein said light-transmissible element has a refractive power.

4. The optical device according to claim 1, wherein:
said first and second cutting edge are formed on said indentation and said engaging segment respectively; and
an extending direction of said first and second cutting edge is the same with an extending direction of said indentation and said engaging segment respectively.

5. An optical device comprising:
a supporting frame that is made by injection molding and that has a frame body defining a through hole, and an extending portion extending from a side of said frame body; and
a light-transmissible element that is made by injection molding and that is disposed on said supporting frame, said light-transmissible element having a main body aligned with said through hole of said frame body, and an extending portion extending from a side of said main body and aligned with said extending portion of said supporting frame;

wherein said extending portion of said supporting frame has a first cutting edge that is formed by disconnecting a first sprue segment therefrom, and said extending portion of said light-transmissible element has a second cutting edge that is formed by disconnecting a second sprue segment therefrom, said extending portion of said supporting frame is formed with an indentation, and said extending portion of said light-transmissible element is formed with an engaging segment engaging said indentation of said extending portion of said supporting frame.

6. The optical element according to claim 5, wherein said first cutting edge is flushed with said second cutting edge.

7. The optical element according to claim 6, wherein said light-transmissible element has a refractive power.

8. The optical element according to claim 5, wherein:

said first and second cutting edge are formed on said indentation and said engaging segment respectively by disconnecting the first and second sprue segments respectively from the supporting frame and the light-transmissible element, and the extending direction of said first and second cutting edge is the same with the extending direction of said indentation and said engaging segment respectively.

9. A method for producing an optical device, comprising the following steps of:
- (a) providing a first mold set defining a first sprue channel and a supporting frame-forming space that is in spatial communication with the first sprue channel;
- (b) filling a raw material of a supporting frame into the supporting frame-forming space and the first sprue channel, so as to form a supporting frame and a first sprue segment that is connected to the supporting frame;
- (c) providing a second mold set, followed by placing the supporting frame together with the first sprue segment into the second mold set, such that the second mold set, the supporting frame and the first sprue segment cooperatively define a second sprue channel and a light-transmissible element-forming space that is in spatial communication with the second sprue channel;
- (d) filling a raw material of a light-transmissible element into the light-transmissible element-forming space and the second sprue channel, so as to form the light-transmissible element and a second sprue segment connected to the light-transmissible element; and
- (e) disconnecting the first and second sprue segments respectively from the supporting frame and the light-transmissible element, so as to form first and second cutting edges respectively on extending portions of the supporting frame and the light-transmissible element, the first and second cutting edges being flush with each other.

10. The method according to claim 9, wherein:
- in step (a), the first mold set defines a plurality of the supporting frame-forming spaces that are in spatial communication with the first sprue channel;
- in step (b), a plurality of the supporting frames are formed, which are connected to the first sprue segment;
- in step (c), the second mold set, the supporting frames and the first sprue segment cooperatively define a plurality of the light-transmissible element-forming spaces that are in spatial communication with the second sprue channel; and
- in step (d), a plurality of the light-transmissible elements are formed, which are connected to the second sprue segment.

11. The method according to claim 9, wherein, in step (e), the first and second sprue segments are disconnected simultaneously.

* * * * *